United States Patent [19]
Kawaguchi et al.

[11] Patent Number: 5,336,358
[45] Date of Patent: Aug. 9, 1994

[54] APPARATUS FOR MANUFACTURING BEAD ASSEMBLIES FOR TIRES

[75] Inventors: Katuhide Kawaguchi, Numazu; Kouichiro Sugino, Ayase; Kazuyoshi Yanagisawa, Hiratsuka, all of Japan

[73] Assignee: The Yokohama Rubber Co., Ltd., Tokyo, Japan

[21] Appl. No.: 920,704

[22] Filed: Jul. 28, 1992

[30] Foreign Application Priority Data

| | | | |
|---|---|---|---|
| Aug. 22, 1991 | [JP] | Japan | 3-210722 |
| Aug. 22, 1991 | [JP] | Japan | 3-210726 |
| Aug. 22, 1991 | [JP] | Japan | 3-210739 |
| Aug. 22, 1991 | [JP] | Japan | 3-210742 |

[51] Int. Cl.$^5$ .................................. B29D 30/48
[52] U.S. Cl. ........................ 156/422; 156/396; 156/460
[58] Field of Search ............ 156/396, 398, 421.4, 156/422, 460, 135, 136, 403, 406.2

[56] References Cited

U.S. PATENT DOCUMENTS

| | | | |
|---|---|---|---|
| 4,087,298 | 5/1978 | Mangun et al. | 156/398 |
| 4,163,683 | 8/1979 | Lammlein | 156/422 |
| 4,196,036 | 4/1980 | Allen et al. | 156/136 |
| 4,354,892 | 10/1982 | Tarantola et al. | 156/398 |
| 4,790,719 | 12/1988 | Portawpi et al. | 156/403 |
| 4,964,931 | 10/1990 | Ring | 156/403 |

*Primary Examiner*—Michael W. Ball
*Assistant Examiner*—Richard Crispino
*Attorney, Agent, or Firm*—Nikaido, Marmelstein, Murray & Oram

[57] ABSTRACT

According to the present invention, a bead assembly consisting of a combination of a ring shaped bead core, a bead filler and a flipper is manufactured by continuous automated steps, whereby productivity is greatly improved. The present invention is characterized by the steps of providing bead locking drums on the free end portions of a plurality of rotary arms arranged radially around the center of rotation thereof, and turning and stopping these rotary arms sequentially so as to set a bead core on a bead locking drum stopped in a first stopping position A, wind a bead filler around the bead core set on the bead locking drum stopped in a second stopping position B to form a bead assembly, and then take out the bead assembly formed on the bead locking drum stopped in a final stopping position D. A third stopping position C is set between the second and final stopping positions, and a flipper is pasted on the bead assembly stopped in this stopping position C.

3 Claims, 20 Drawing Sheets

APPARATUS FOR MANUFACTURING BEAD ASSEMBLIES FOR TIRES

BACKGROUND OF THE INVENTION

This invention relates to a method of and an apparatus for manufacturing bead assemblies for tires, and more particularly to a method of and an apparatus for manufacturing a bead assembly which consists of a ring-shaped bead core, a bead filler and a flipper by continuous automated steps.

As shown in FIG. 34, in the inner part of a tire T, ring-shaped bead cores W each of which consists of a bundle of metal wires are disposed in the left and right bead portions, and bead fillers F of hard rubber around the outer circumferences of the bead cores, both end portions of a carcass 201 being folded up so as to wrap these bead cores W and bead fillers F in the folded portions. For forming such a tire, a bead core W and a bead filler F are prepared in the form of a bead assembly in which these parts are combined unitarily in advance. In the production of a high-performance tire, a bead assembly, in which a flipper consisting of a rubber-coated cotton cloth is attached on the inner circumferential portion of a bead assembly mentioned previously so as to cover both side surfaces of the bead core and bead filler therewith, is used in some cases.

The assembling of these bead assemblies has heretofore been done manually in general cases. The manual assembling of one of these bead assemblies is done by initially provided a ring-shaped bead core W as shown in FIG. 35(A), and then winding belt type unvulcanized rubber as a bead filler F, which is cut to a length equal to the outer circumferential length of the bead core W, around the outer circumference of the bead core W as shown in FIG. 35(B), to obtain a complete product. In the case of the manual assembling of a bead assembly for a high-performance tire, a step of attaching a flipper Fr consisting of an unvulcanized rubber-impregnated reinforcing cloth on the previously-mentioned bead assembly is further carried out so as to cover the inner circumferential surface of the bead core W and both side surfaces of the bead filler F therewith as shown in FIG. 35(C).

However, since assembling a bead assembly by such a manual operation requires a great deal of skill, the operation efficiency and productivity become low. Since such bead assemblies are produced by manual operations, different assembling accuracies result from different parts, so that it is difficult to obtain high-quality bead assemblies.

SUMMARY OF THE INVENTION

An object of the present invention is to provide a method of and an apparatus for manufacturing bead assemblies each of which consists of a ring-shaped bead core, a bead filler and a flipper by continuous automated steps, whereby the productivity can be greatly improved.

Another object of the present invention is to provide an apparatus capable of practicing bead assembly manufacturing steps without requiring a large space.

Still another object of the present invention is to provide an apparatus capable of manufacturing bead assemblies of a high and uniform quality and a high accuracy.

A method of manufacturing bead assemblies, which achieves these objects, comprises the steps of arranging a plurality of rotary arms radially so as to be spaced from one another at a predetermined angle around the center of rotation thereof, providing bead locking drums on the free end portions of the rotary arms, and turning and stopping these rotary arms sequentially so as to set a bead core on a bead locking drum stopped in a first stopping position A, wind a bead filler around the bead core set on the bead locking drum stopped in a second stopping position B to form a bead assembly, and take out the bead assembly from the bead locking drum stopped in a final stopping position D.

This method further includes the steps of setting a third stopping position C between the second and final stopping positions B, D, and attaching a flipper on the bead assembly stopped in the stopping position C and formed in the stopping position B on the bead locking drum.

An apparatus according to the present invention for practicing these bead assembly manufacturing methods comprises a rotary unit which comprises a plurality of rotary arms arranged radially on the circumferential surface of a rotary shaft, and bead locking drums provided on the free end portions of the rotary arms, and which is formed so that these rotary arms are rotated to and stopped in at least three stopping positions in order, a loading unit provided opposite to the first stopping position A for the rotary arms and adapted to transfer a bead core to a bead locking drum standing by in the same stopping position A, a bead filler building unit provided opposite to the second stopping position B for the rotary arms and adapted to wind a bead filler around a bead core set on a bead locking drum standing by in the same stopping position B, and a recovery unit provided opposite to the final stopping position D for the rotary arms and adapted to take out a completed bead assembly formed on a bead locking drum standing by in the same stopping position D.

This apparatus further includes a third stopping position C set between the second and final stopping positions B, D, and a flipper building unit provided opposite to the third stopping position C and adapted to attach a flipper on a bead assembly consisting of a bead core and a bead filler and formed on a bead locking drum standing by in the third stopping position C.

According to the present invention, the method of and apparatus for manufacturing bead assemblies have the above-mentioned constitution, so that the productivity can be improved greatly by manufacturing a bead assembly consisting of a combination of a ring-shaped bead core and a bead filler or a bead assembly consisting of a combination of a ring-shaped bead core, a bead filler and a flipper through continuous automated steps. The apparatus according to the present invention enables the bead assembly forming steps to be carried out without requiring a large space, and bead assemblies of a high and uniform quality and a high accuracy to be manufactured.

DESCRIPTION OF THE PREFERRED EMBODIMENTS

Figure 1:
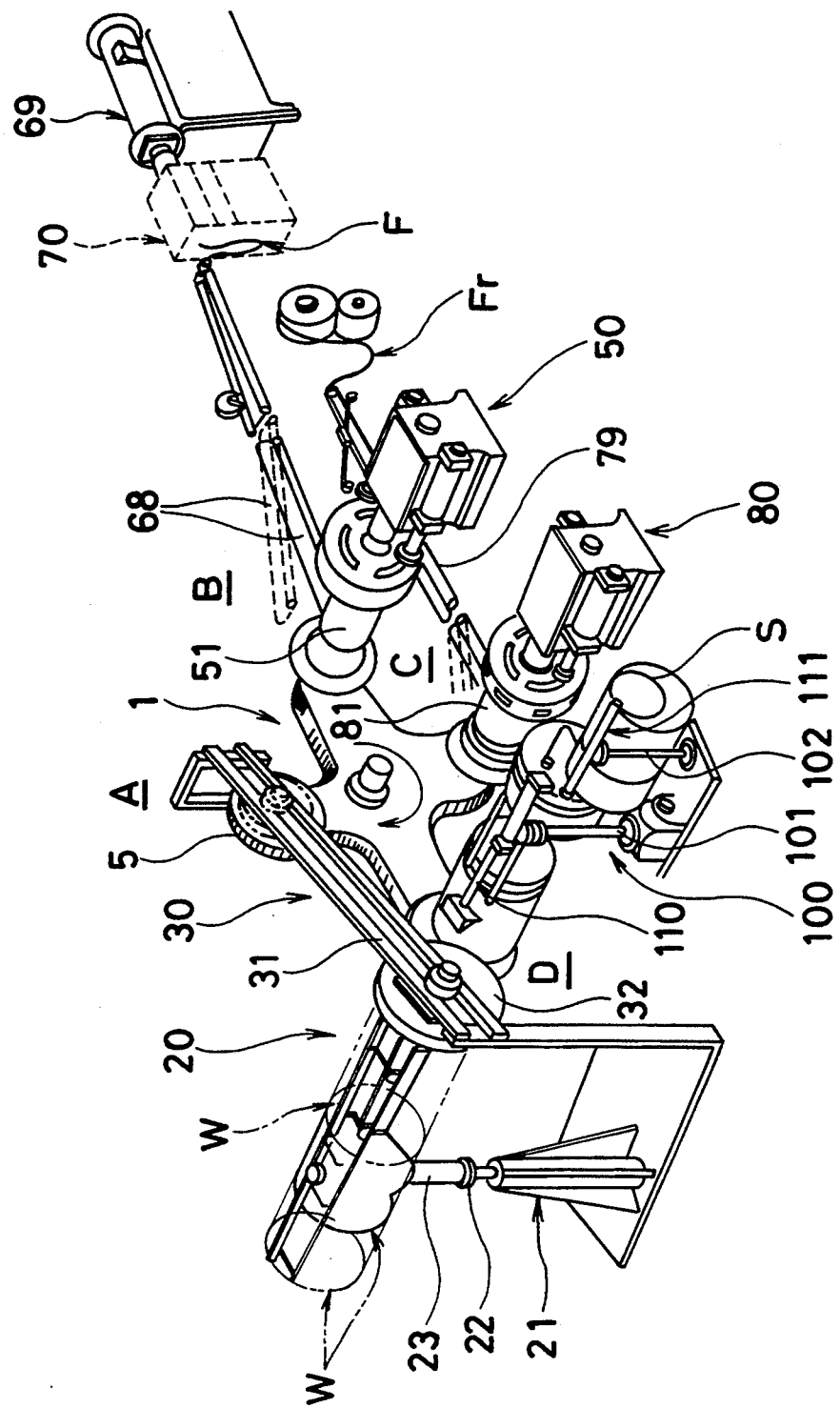
FIG. 1 is a schematic general perspective view of the apparatus for manufacturing bead assemblies according to the present invention.
Figure 35A:
Figure 35B:
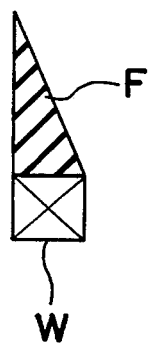
Figure 35C:
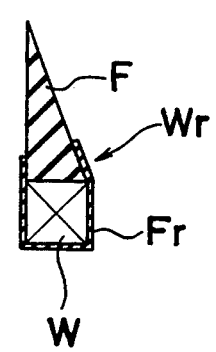

FIG. 1 is a general diagram of the bead assembly manufacturing apparatus according to the present invention used to form a bead assembly Wr shown in FIG. 35(C) and consisting of a bead core W, a bead filler F and a flipper F.

This bead assembly manufacturing apparatus is provided with a rotary unit 1 in the central portion thereof. This rotary unit 1 is provided with four rotary arms having bead locking drums 5 at the free end portions thereof and projecting radially so as to be spaced from one another at 90° intervals, and it is moved so that these rotary arms are turned in one direction at 90° at a time and stopped, the turning and stopping of these rotary arms being repeated in order. In the positions A, B, C, D in which these rotary arms are stopped, the following devices for feeding a bead core W, a bead filler F and a flipper Fr of a bead assembly Wr thereto and assembling these parts in order are provided.

In the position A, a loading unit 30 for delivering a bead core W to a bead locking drum 5 stopping in this position is provided so as to be opposed to the same drum 5. In the position B, a bead filler building unit 50 for winding a bead filler F around a bead core W on the bead locking drum 5 stopping in this position is provided so as to be opposed to the same drum. In the position C, a flipper building unit 80 for attaching a flipper Fr on an assembly of a bead core W and a bead filler F on the bead locking drum 5 stopping in this position is provided so as to be opposed to the same drum. In the final position D, a recovery unit 100 for taking out a completed bead assembly Wr held on the bead locking drum 5 stopping in this position D is provided so as to be opposed to the same drum.

The rotary unit 1 and the assembling units provided in the various stopping positions will now be described in detail.

Figure 2:
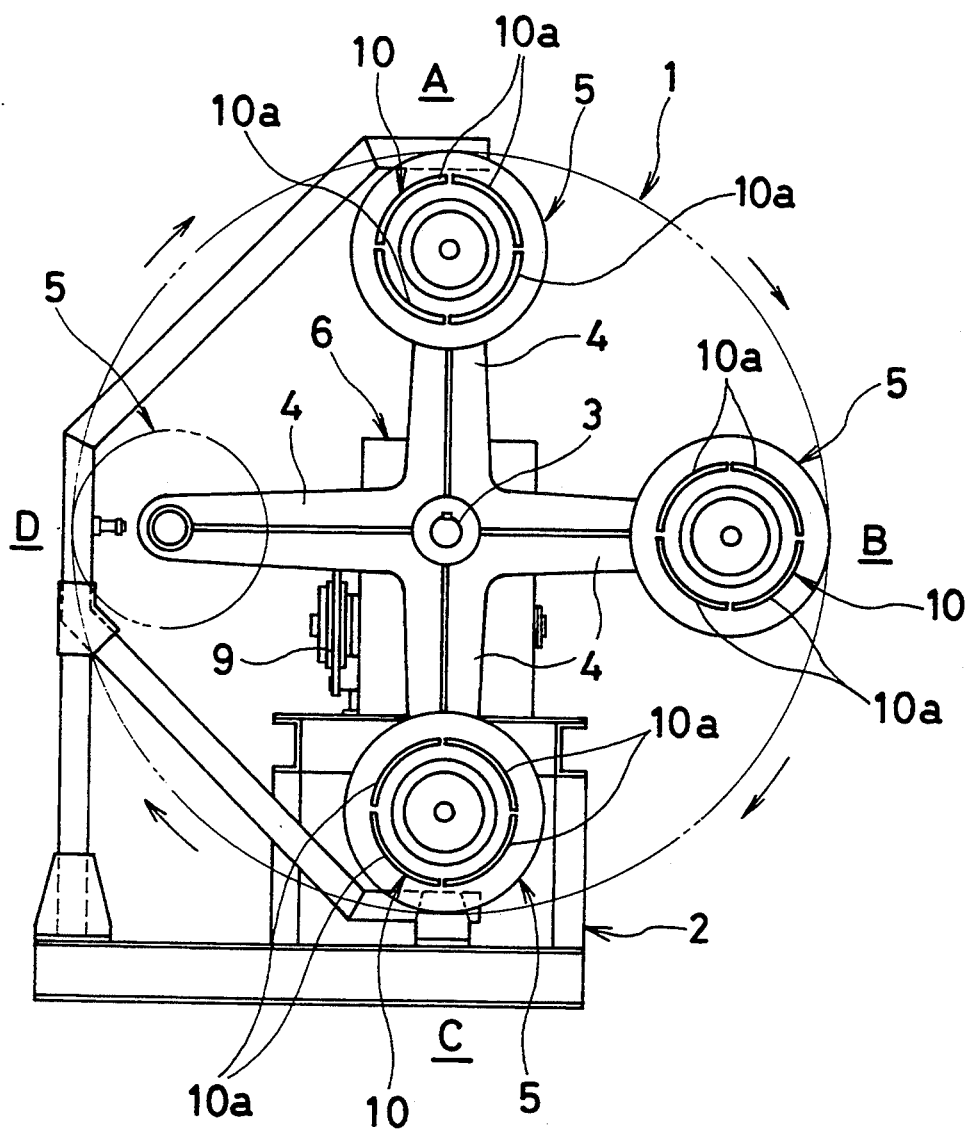
FIGS. 2 and 3 are front and side elevations of a rotary unit.
Figure 3:
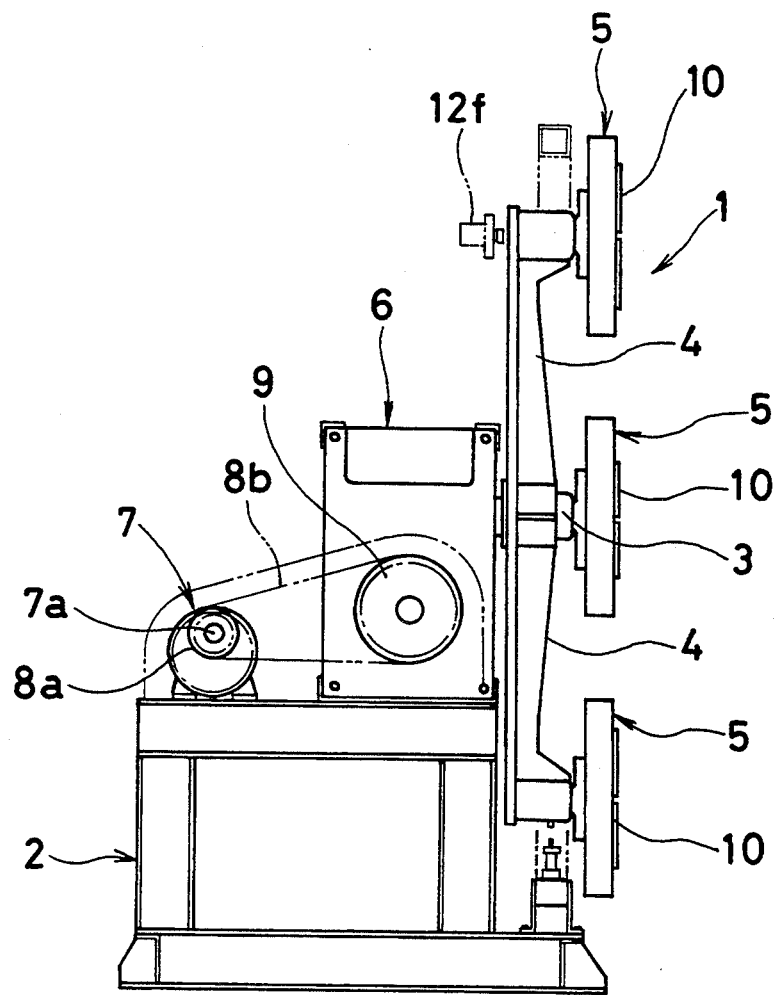

As shown in FIGS. 2 and 3, the rotary unit 1 is provided with four rotary arms 4, which can be turned around a rotary shaft 3 as a fulcrum supported horizontally on a base 2, on the front end portion of the rotary shaft 3 so that the rotary arms 4 are spaced at 90° intervals. A bead locking drum 5 for holding a bead core W thereon is attached to the free end portion of each rotary arm 4. The rotary shaft 3 is supported rotatably on an index unit 6 capable of indexing 90° (regulating an angle). A driving motor 7 for operating this index unit 6 is provided on the portion of the upper surface of the base 2 which is on the side of a side surface of the index unit 6. The index unit 6 is provided with a torque limiter, and sprockets 9, 8a are provided on the index unit 6 and on a rotary shaft 7a of the driving motor 7 respectively. An endless driving chain 8b is passed around these sprockets 8a, 9. Accordingly, each of the bead locking drums 5 attached to the rotary arms 4 can be turned to and stopped in the first, second, third and final stopping positions A, B, C, D shown in FIG. 2, by the driving force of the driving motor 7.

Figure 4:
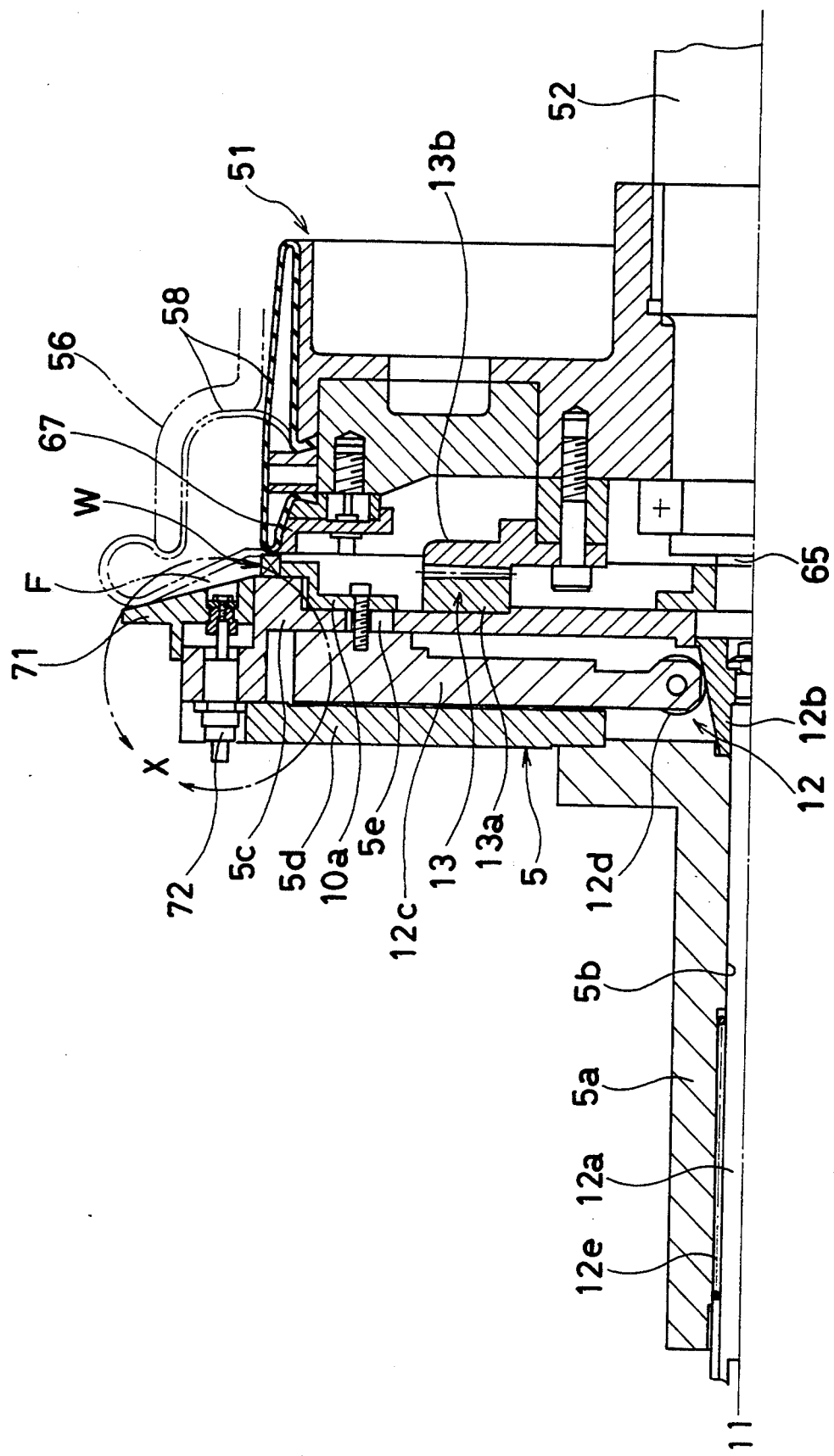
FIG. 4 is a half-sectioned illustration of an engagement portion between a bead locking drum of the rotary unit and a bladder drum of a bead filler building unit.
Figure 5:
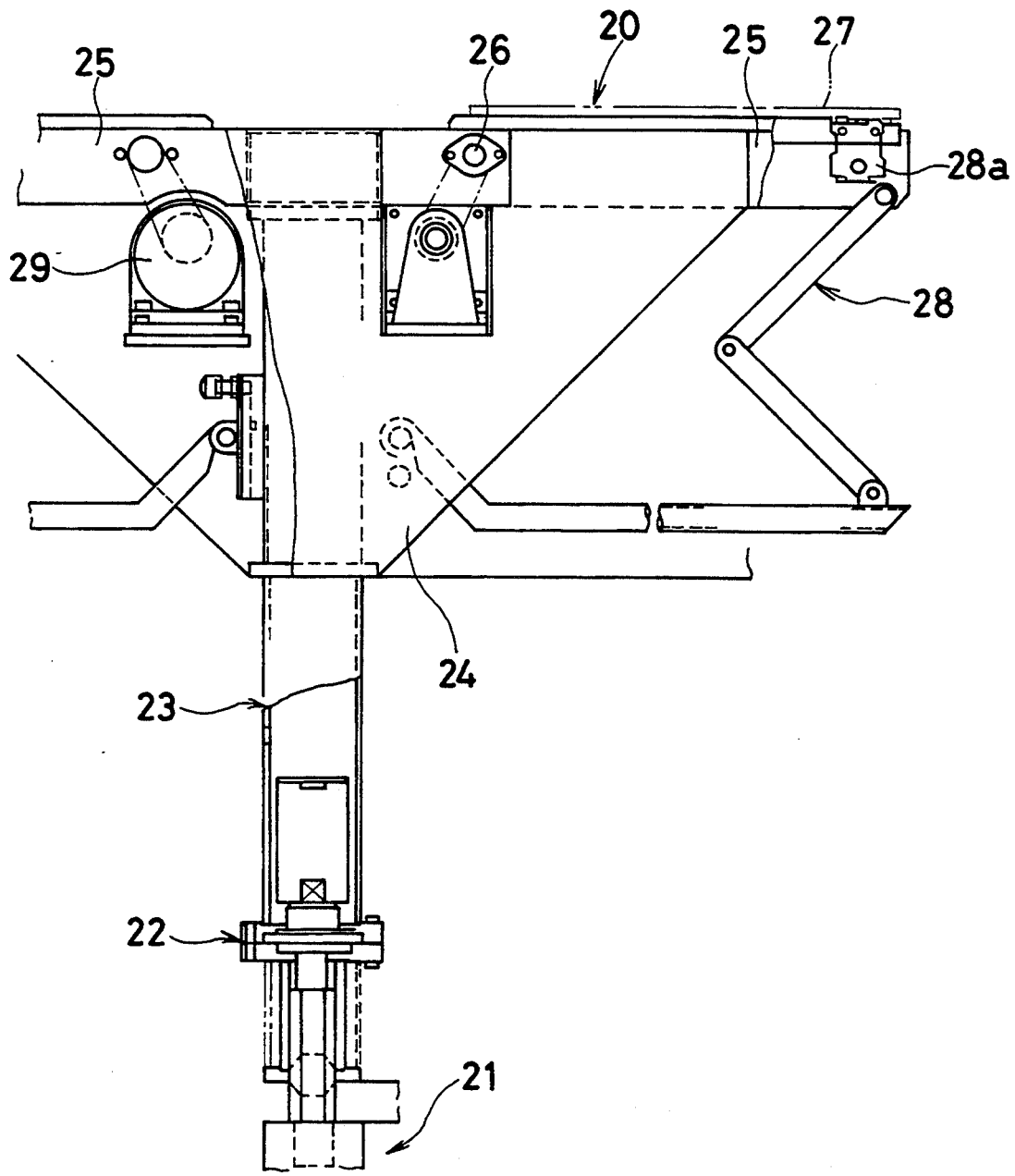
FIGS. 5–7 are an enlarged partial front elevation, a schematic perspective view and a partial side elevation of a bead core feed unit.
Figure 6:
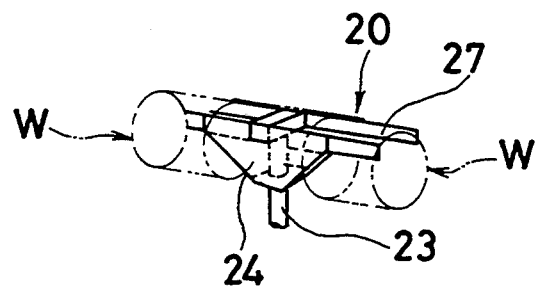
Figure 7:
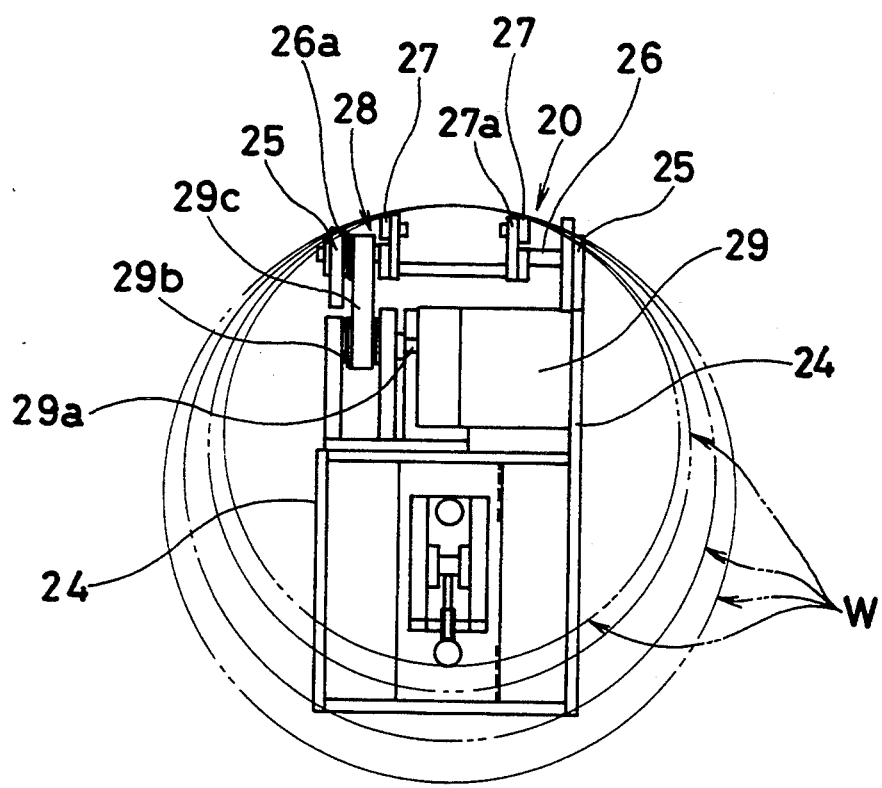

As shown in FIGS. 2–4, a plurality of expansible rings 10 for supporting the bottom surface of a bead core W are arranged so as to extend in the circumferential direction. Each of these expansible rings 10 is formed so that it can be expanded and contracted in the diametrical direction via an expansion-contraction mechanism 12 provided in the relative bead locking drum 5. The expansion-contraction mechanism 12 has a shaft member 12a inserted slidably in a through bore 5b provided in a support portion 5a of a bead locking drum 5 attached to a rotary arm 4. A columnar member 12b having a tapering side surface is fitted firmly around the front end portion of this shaft member 12a. Retainer members 12c are fixed at one end thereof to ring members 10a forming the expansible ring 10, and rotatable rollers 12d are provided fixedly on the other end thereof, these rollers 12d contacting the tapering portion of the columnar member 12b. The retainer members 12c are provided slidably between a front side member 5c of a bead locking drum 5 and a rear side member 5d thereof, and constantly urged toward the shaft member 12a by a spring member (not shown). The ring members 10a provided on the front side member 5c of the bead locking drum 5 are fixed to the retainer members 12c via elongated holes 5e formed in the front side member 5c. A spring member 12e fixed at one end thereof to the shaft member 12a and at the other end thereof to the surface defining the through bore 5b is provided on the rear end portion of the shaft member 12a, and constantly urges the shaft member 12a in the leftward direction of FIG. 4. On the rear end of the shaft member 12a, a fluid pressure cylinder 12f (FIG. 3) is provided to enable the shaft member 12a to be moved back and forth. Accordingly, when the shaft member 12a is moved to right in FIG. 4 by an operation of the fluid pressure cylinder 12f, the rotatable roller 12d is moved by spring members along the tapering portion of the columnar member 12d toward the shaft member 12a, so that the ring members 10a are also moved toward the shaft member 12a. Consequently, the expansible ring 10 contracts. When the shaft member 12a is moved in the leftward direction of FIG. 4 by an operation of the fluid pressure cylinder 12f and a spring member 12e, the rotable roller 12d is moved along the tapering portion of the columnar member 12b and away from the shaft member 12a, so that the ring members 10a are also moved away from the shaft member 12a. Consequently, the expansible ring 10 expands.

The portion of the side surface of a bead locking drum 5 which is on the side of the center thereof (the portion of the front side member 5c which is on the side of the shaft member 12a) is provided with one clutch member 13a forming one part of a clutch mechanism 13 engageable with and disengageable from a bladder drum 51 which will be described later.

Before describing the loading unit 30, a feed unit 20 adapted to supply bead cores W sequentially to this loading unit 30 will be described. In this feed unit 20, a rotable shaft 23 is fixed to the upper end of a vertically provided support post 21 via a joint 22 as shown in FIGS. 1 and 5-7. Two horizontally parallel fixed arms 25 are fixed to the upper end of this rotary shaft 23 via two brackets 24. A rotatable eccentric shaft 26 is provided between the fixed arms 25, and two moving arms 27, one end portion of each of which is supported on a parallel link mechanism 28 via retaining members 28a, are fixed at the other ends thereof to this eccentric shaft 26 via support members 27a. A driving motor 29 for turning the eccentric shaft 26 is provided thereunder. A pulley 29b is mounted fixedly on a rotary shaft 29a of this driving motor 29, and an endless belt 29c is passed around this pulley 29b and a pulley 26a mounted on the eccentric shaft 26. Accordingly, when the driving motor 29 is turned with a plurality of bead cores W hung on the fixed arms 25 at predetermined intervals, the moving arms 27 are turned by the eccentric shaft 26 in the vertical and longitudinal directions as they trace elliptic orbits. The bead cores W hung on the fixed arms 25 are thus sent sequentially to a position in which they are transfered onto the loading unit 30.

Figure 8A:
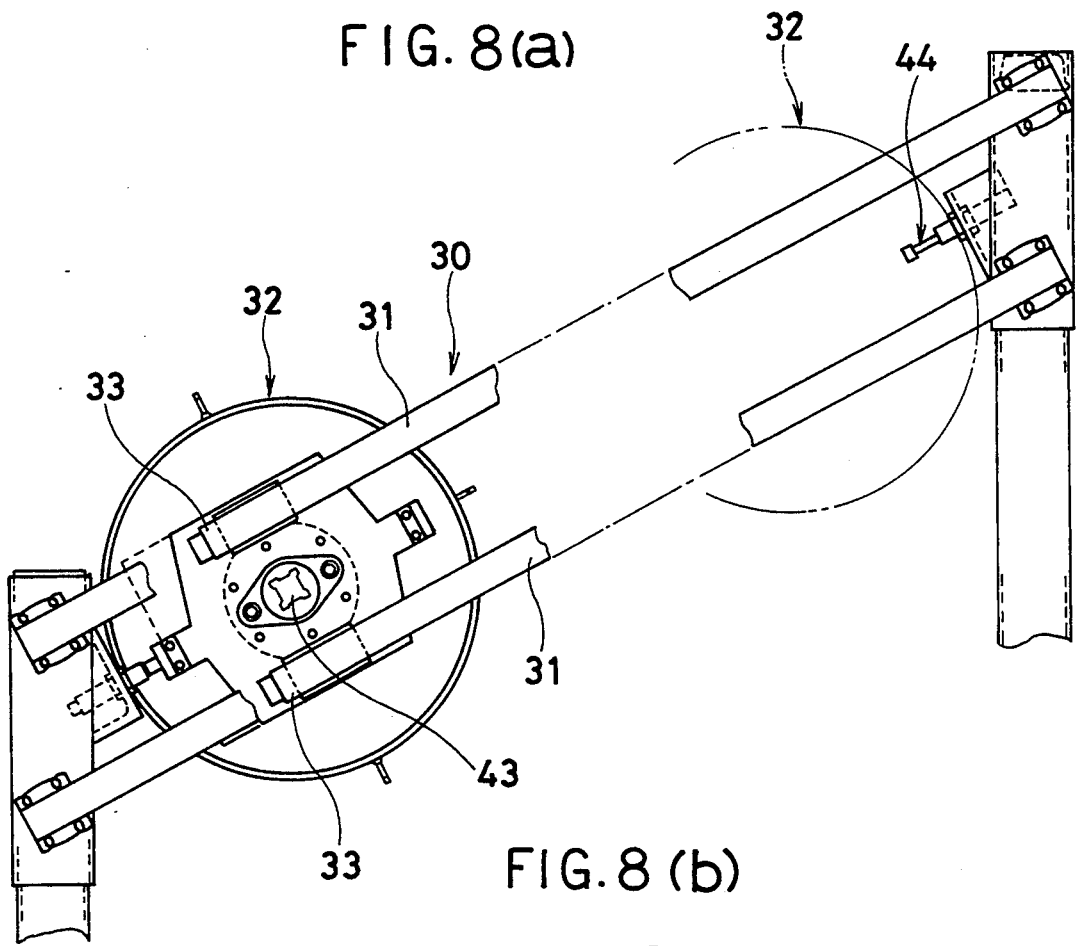
FIG. 8(a) is a partially cutaway view in front elevation of a loading unit.
Figure 8B:
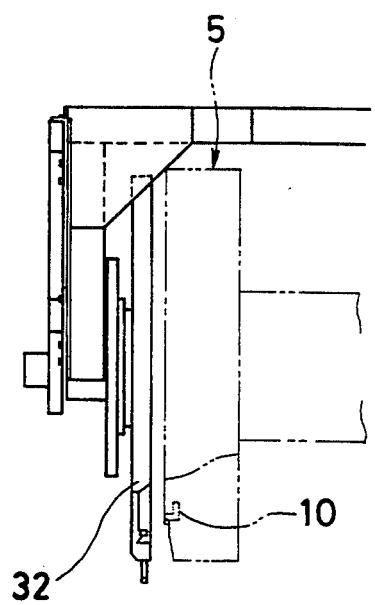
FIG. 8(b) illustrates a base plate body of the loading unit in a position in which a first formation step is carried out.
Figure 9:
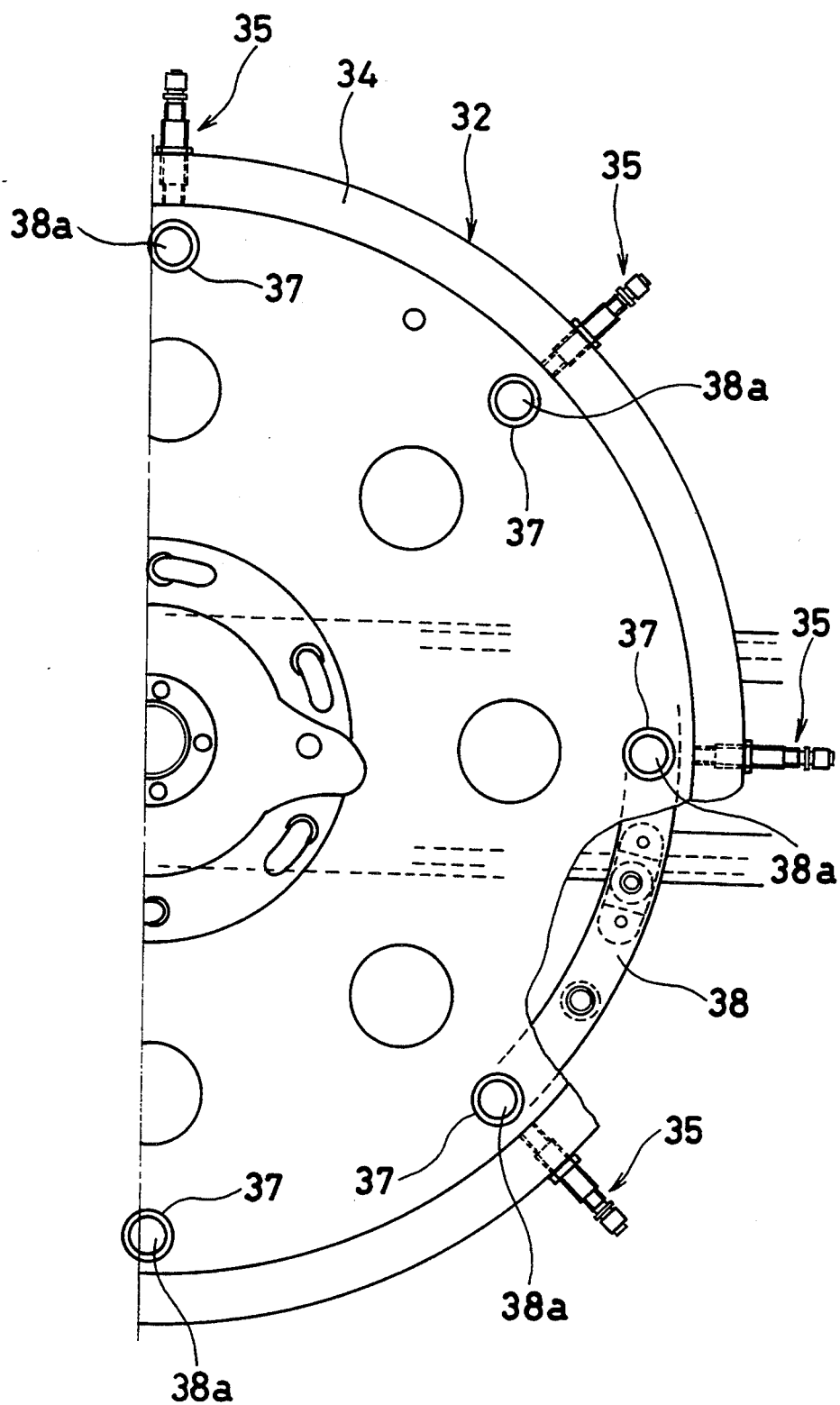
FIG. 9 is a partially cutaway view in front elevation of a half of the base plate body of the loading unit.
Figure 10:
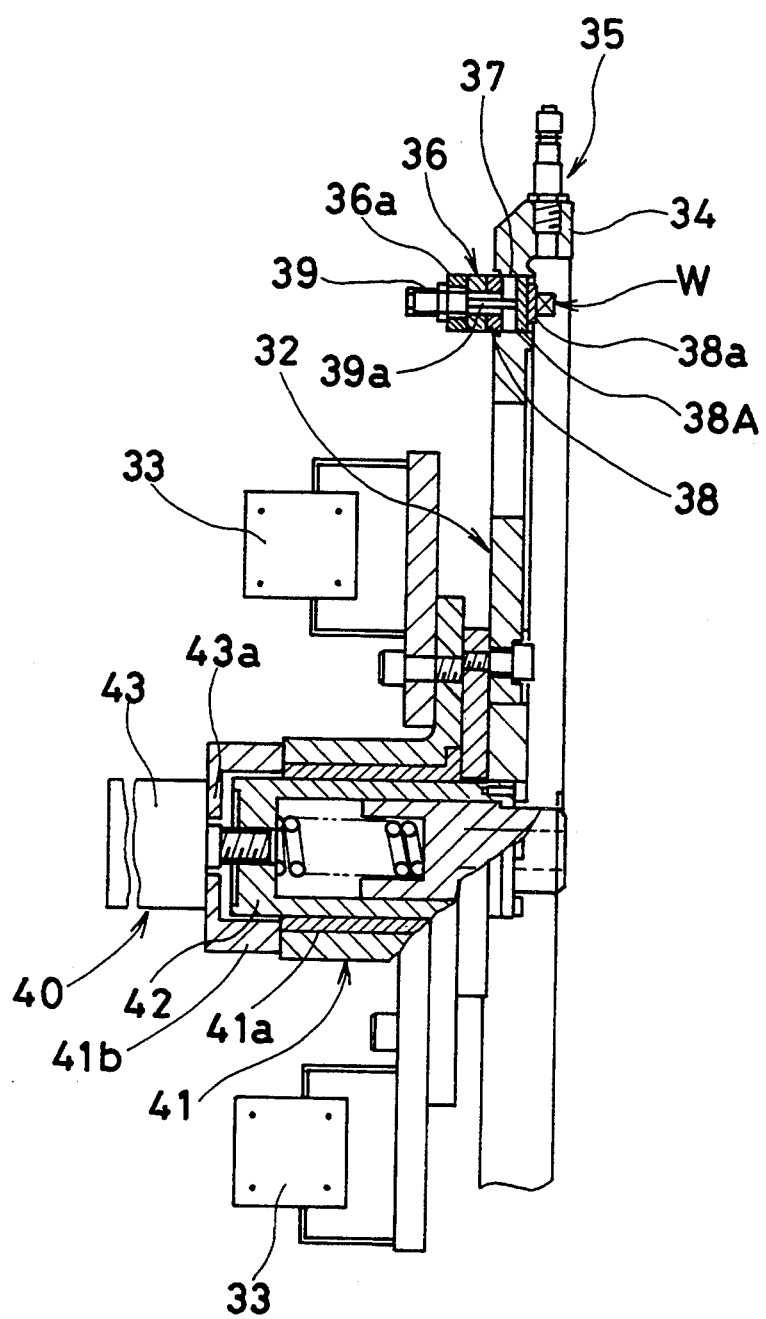
FIG. 10 is a side elevation of the base plate body of the loading unit with its principal portion shown in partial section.

The loading unit 30 adapted to receive a bead core W in this transfer position and send it to the first stopping position A of the rotary unit 1 has two guide rails 31 provided so as to incline upward from the transfer position toward the first stopping position A as shown in FIGS. 8–10. A cross-sectionally recessed circular base plate body 32 is slidably attached to these guide rails 31. The base plate body 32 is formed so that it can be moved back and forth between the transfer position and first stopping position A by the operations of the rodless cylinders 33 provided between the guide rails 31 and base plate body 32.

As shown in FIGS. 9 and 10, the base plate body 32 is provided with a plurality of bead correcting means 35 arranged at predetermined intervals in the circumferential direction of a flange portion 34 formed at the circumferential edge portion of the base plate body 32, the bead correcting means 35 being adapted to project toward the center of the base plate body 32 and retract in the opposite direction. Each of these bead correcting means 35 is comprised of a short cylinder. A plurality of means 36 for attracting or releasing the side surfaces of bead cores W are fixed to the portions of the side surface of the base plate body 32 which are close to the peripheral portion thereof so as to be spaced at predetermined intervals in the circumferential direction of the base plate body 32. Each of these bead core attract-releasing means 36 is arranged on a magnetization ring 38 fixed to the base plate body 32 along through bores 37 made in the wall thereof. It has a cylinder 39 fixed via a mounting member 36a to the surface of the magnetization ring 38 which is on the opposite side of the through bore 37. A magnet block 38a adapted to be moved slidingly in the through bore 37 and provided with a magnet 38a for attracting a bead core W thereto is fixed to the front end of a rod 39a in the cylinder 39. In order to attract the side surface of the bead core W, the magnet 38a is moved up to the end surface of the through bore 37 to attract and hold the side surface of the bead core W with a magnetic force. In order to release the bead core W, the magnet 38a is moved back from the side surface of the through bore 37 by an operation of the cylinder 39, whereby the side surface of the bead core W can be removed from the magnet 38a.

The base plate body 32 is provided on the central portion of its side surface with a push-in unit 40 for use in forcing the base plate body 32 into the bead locking drum 5 when the base plate body 32 has been moved to a position in which the base plate body 32 is opposed to the bead locking drum 5. As shown in FIG. 10, this push-in unit 40 has a push-in slide shaft 42 inserted slidably in a tubular portion 41a of a mounting base 41 fixed with the rodless cylinders 33 in the rear side of the base plate body 32. This push-in slide shaft 42 is fixed at its rear end to a rod 43a of a push-in cylinder 43 fixed to a cover member 41b attached to the tubular portion 41a. The front end of the push-in slide shaft 42 is fixed to the base plate body 32. Accordingly, the base plate body 32 on which an attracted bead core W is held can be forced into the bead locking drum 5 by the rod 43a in an extended state of the push-in cylinder 43. A reference numeral 44 in FIG. 8a denotes a shock absorber provided between the two guide rails 31 and adapted to stop the base plate body 32.

Figure 11:
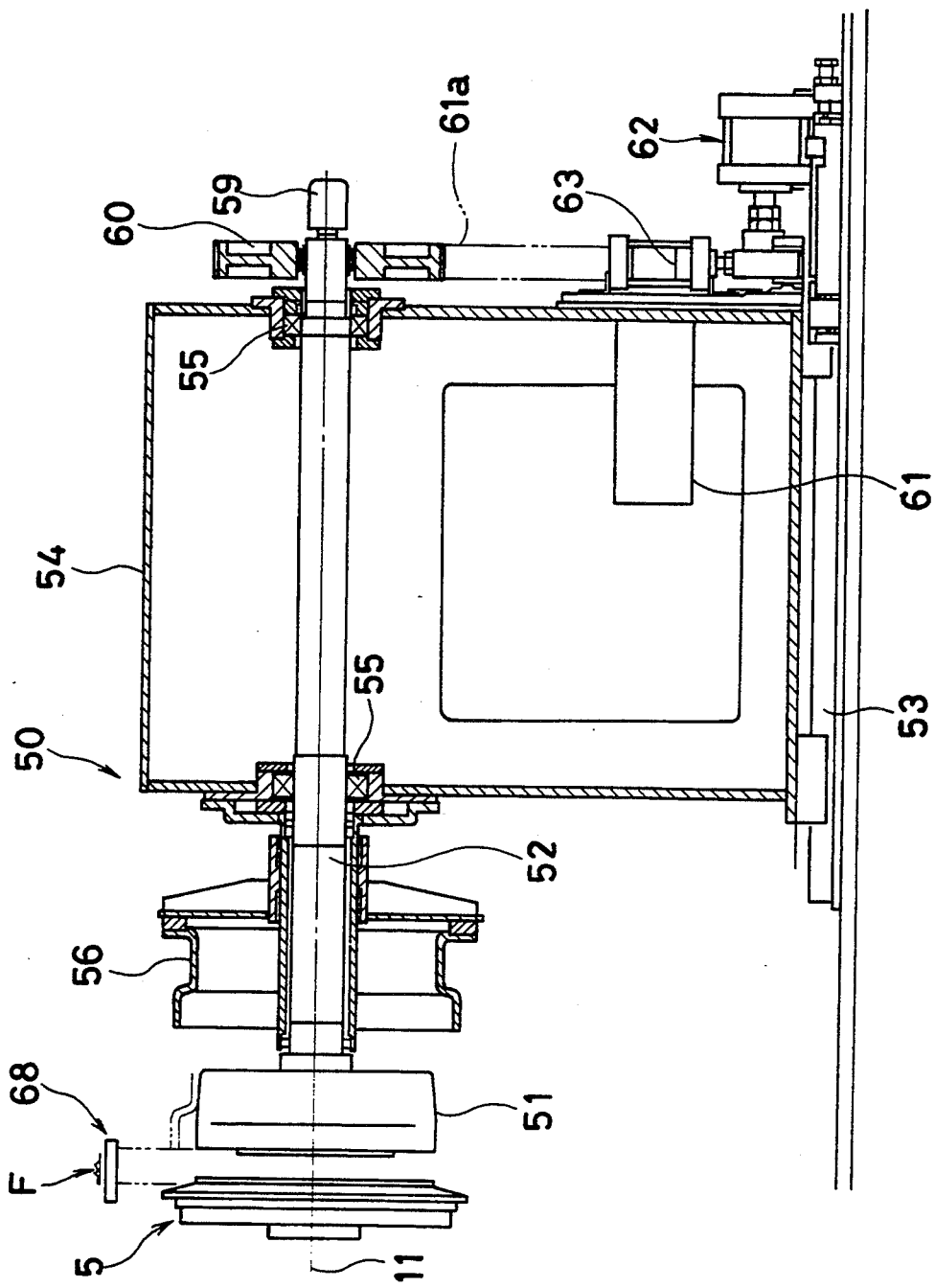
FIGS. 11 and 12 are a partially sectioned front elevation and a partially cutaway view in plan of a bead filler building unit.
Figure 12:
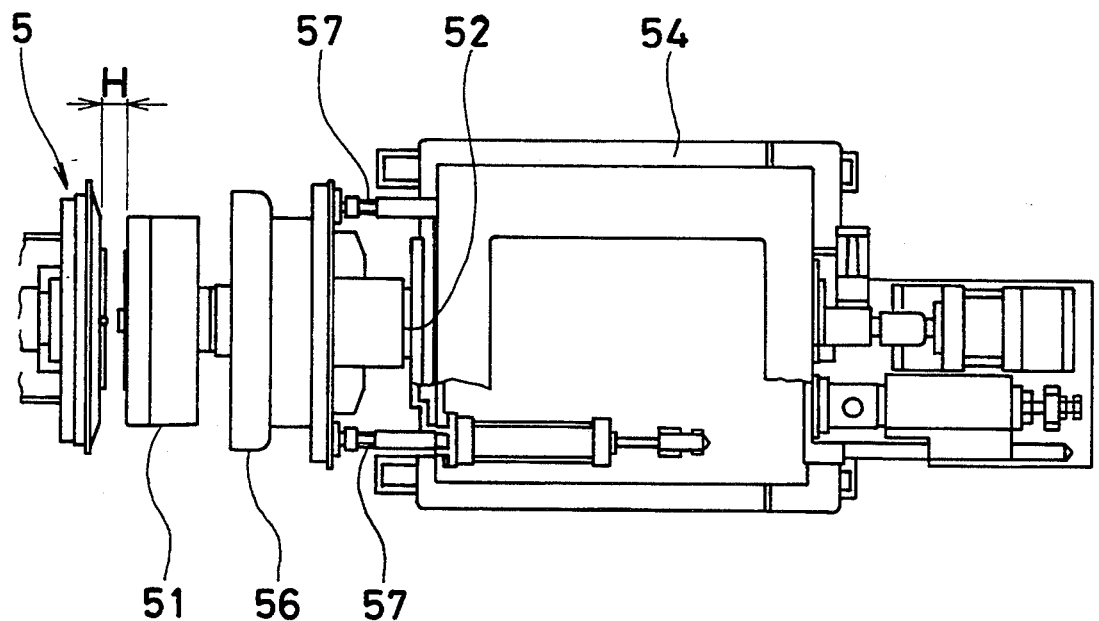

The bead filler building unit 50 disposed opposite to the second stopping position B is provided with a driving shaft 52 of a bladder drum 51. The driving shaft 52 has a same axis as the axis 11 of the support shaft of the bead locking drum 5 as shown in FIGS. 4, 11 and 12. This driving shaft 52 is supported rotatably via bearings 55 on a drum unit body 54 placed slidably on a slide rail 53. The bladder drum 51 and a pusher ring 56 slidingly movable along the driving shaft 52 are mounted on the front end portion of the driving shaft 52. As shown in FIG. 12, the pusher ring 56 is formed so as to be moved toward and away from the bladder drum 51 by pusher cylinders 57. The bladder drum 51 is provided on its outer circumferential surface with an expandable bladder 58 as shown in FIG. 4. On the rear end portion of the driving shaft 52, a rotary joint 59 and a pulley 60 are mounted. The driving shaft 52 is turned by a driving motor 61 via a pulley (not shown) fixed to the driving motor 61, a belt 61a and a pulley 60. The drum unit body 54 is constructed so that it can be moved slidingly along the slide rail 53 by a slide cylinder 62. A reference numeral 63 denotes a drum unit body locking cylinder.

As shown in FIG. 4, the front side surface of the bladder drum 51 is provided with another clutch members 13b adapted to be engaged with and disengaged from the clutch members 13a formed on the bead locking drum 5, which clutch members 13b, 13a form the clutch mechanism 13 (tooth type face clutch). A centering boss 65 is provided at the central portion of the bladder drum 51. The bladder drum 51 and driving shaft 52 are provided therein with passages (not shown) for supplying air into the bladder 58. A ring 67 for fitting the position of the bladder 58 to the bead core W is fitted around the circumferential edge portion of the bladder drum 51. The bead locking drum 5 and bladder drum 51 are formed so that they are engaged with and disengaged from each other via the clutch mechanism 13 as mentioned above. When the clutch mechanism 13 is uncoupled, a clearance H through which a bead assembly Wx with a bead filler F pasted thereon can be taken out is formed as shown in FIG. 12. Above the bead locking drum 5 and bladder drum 51, a front end-swingable attaching conveyor 68 for use in attaching a fin-carrying bead filler F on a bead core is disposed horizontally as shown in FIGS. 1 and 11. A bead filler F forced out from an extruder 69 is supplied to this attaching conveyor 68 via a reception conveyor 70. The bead filler F is cut to a predetermined length on the attaching conveyor 68. The attaching conveyor 68 is constructed so as to automatically attach a bead filler F on a bead core W held on the bead locking drum 5.

Figure 13:
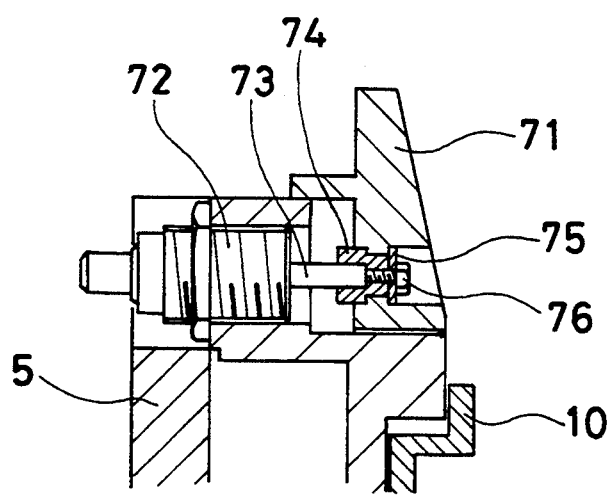
FIG. 13 is an enlarged section of an X-portion of FIG. 4.

A support wall 71 capable of being moved back and forth and adapted to support the rear surface of a fin-carrying bead filler F is attached to the circumferential edge portion of the bead locking drum 5 as shown in FIGS. 4 and 13. This support wall 71 is fixed to a rod 73 of a support wall-moving cylinder 72 screw-fitted in the circumferential edge portion of the bead locking drum 5, with a set screw 76 via a fixing block 74 and a mounting member 75. Accordingly, the support wall 71 can be released by another by removing the set screw 76. A plurality of support walls 71 having different angles of inclination are produced in advance, and, if these support walls 71 are used in an interchanging manner, the bead filler F can be attached on a bead core vertically or at a predetermined angle of inclination. The support wall 71 can be moved forward and backward with the fixing block 74 in the direction of the axis of the support shaft 11 by the support wall-moving cylinder 72.

Figure 14:
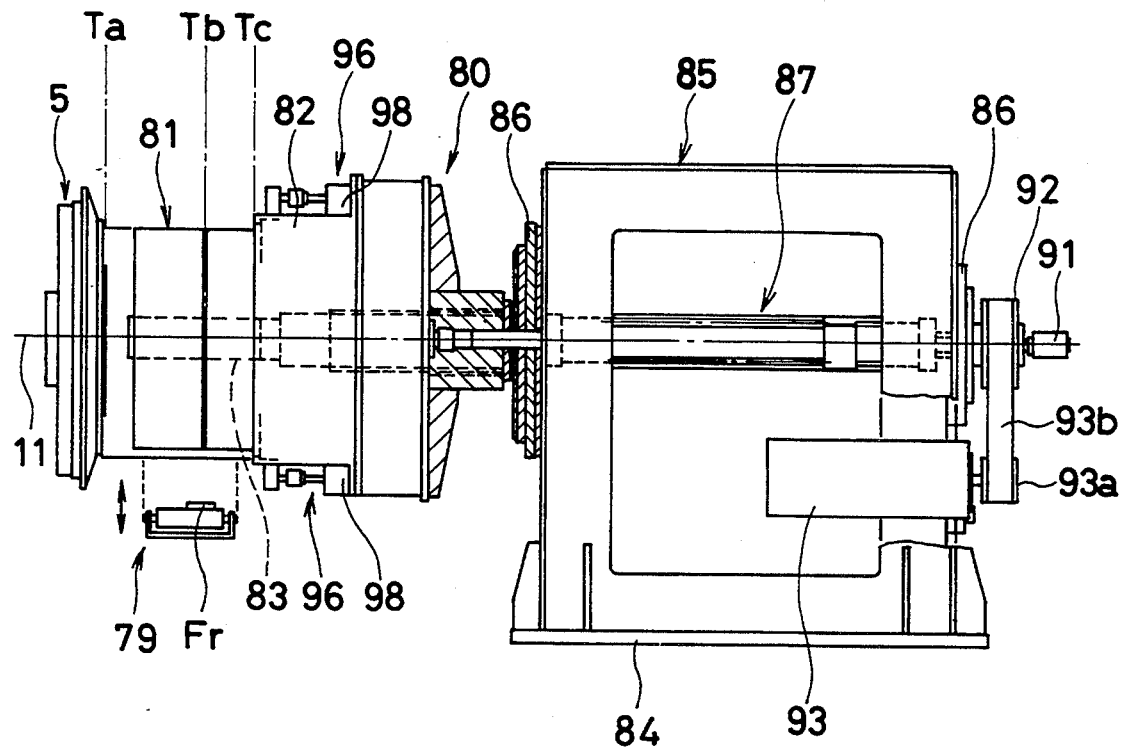
FIG. 14 is a partially cutaway view in partially sectioned front elevation of a flipper building unit.
Figure 15:
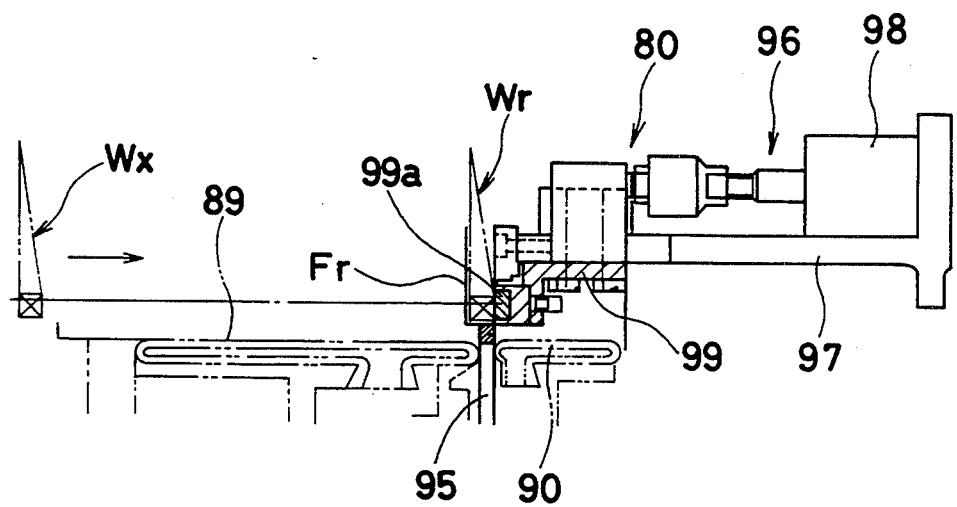
FIG. 15 is an enlarged front elevation, partly in section, of a flipper transfer unit.

The flipper building unit 80 disposed opposite to the third stopping position C is provided with a driving shaft 83 having a turnup drum 81 and a transfer ring 82 on the front end portion thereof, as shown in FIGS. 14 and 15. This driving shaft 83 has a same axis as the axis 11 of a support shaft of a bead locking drum 5 and is supported rotatably via bearings 86 on a flipper building unit body 85 placed on a base 84. The transfer ring 82 mounted on the driving shaft 83 is formed so that it can be moved to and stopped in an advancement position Ta in which the transfer ring 82 engages the bead locking drum 5, a flipper building position Tb and a retirement position Tc by a two-stage cylinder 87 provided in the flipper building unit body 85. The turnup drum 81 is provided on its outer circumferential surface with expansible main and auxiliary bladders 89, 90 as shown in FIG. 15. A rotary joint 91 and a pulley 92 are mounted on the rear end portion of the driving shaft 83. This driving shaft 83 is turned by a driving motor 93 via a pulley 93a fixed to the motor 93, a belt 93b and the pulley 92.

A flipper transfer unit 96 adapted to attract and hold a bead assembly Wx formed on the bead locking drum 5 and transfer the same to the outer surface of a bead locking ring 95 is provided on the transfer ring 82. This flipper transfer unit 96 has a transfer cylinder 98 on a frame 97. A support ring 99 is fixed to the front end portion of a rod of the transfer cylinder 98 and it has magnets 99a for attracting a bead assembly Wx thereto. A vertically movable flipper attaching conveyor 79 adapted to supply a flipper Fr, which has been cut to a predetermined length in advance, is provided below the flipper building position Tb of the turnup drum 81. The flipper Fr is placed on a predetermined portion of the turnup drum 81 by the flipper attaching conveyor 79, and a bead assembly Wx is put on the flipper Fr by a flipper transfer unit 96. The flipper Fr is then attached on the bead assembly Wx by the main and auxiliary bladders 89, 90 so as to cover the inner circumferential surface of the bead core W and both side surfaces of the bead filler F therewith, whereby a flipper-carrying bead assembly Wr is formed.

The recovery unit 100 disposed opposite to the final stopping position D is provided with a rotating and indexing (angular) position-regulatable rotary shaft 101 for a completed product, and a rotary shaft 102 for a separator. These rotary shafts 101, 102 are set up perpendicularly with a predetermined distance left therebetween. The rotary shaft 101 is turned by a 180° indexable motor 104 set on a lower base plate 103, and the rotary shaft 102 for a separator by a 180° rotatable cylinder 105. The rotary shafts 101, 102 are provided at their upper portions with a completed product storage arm 107 and a separator storage arm 108 via joints 106a, 106b respectively so that these arms extend horizontally. The rotary shafts 101, 102 are provided on their upper ends with a support frame 109 so that the frame extend horizontally, and a completed product attracting means 110 and a separator suction means 111 are provided on this support frame 109.

Figure 16:
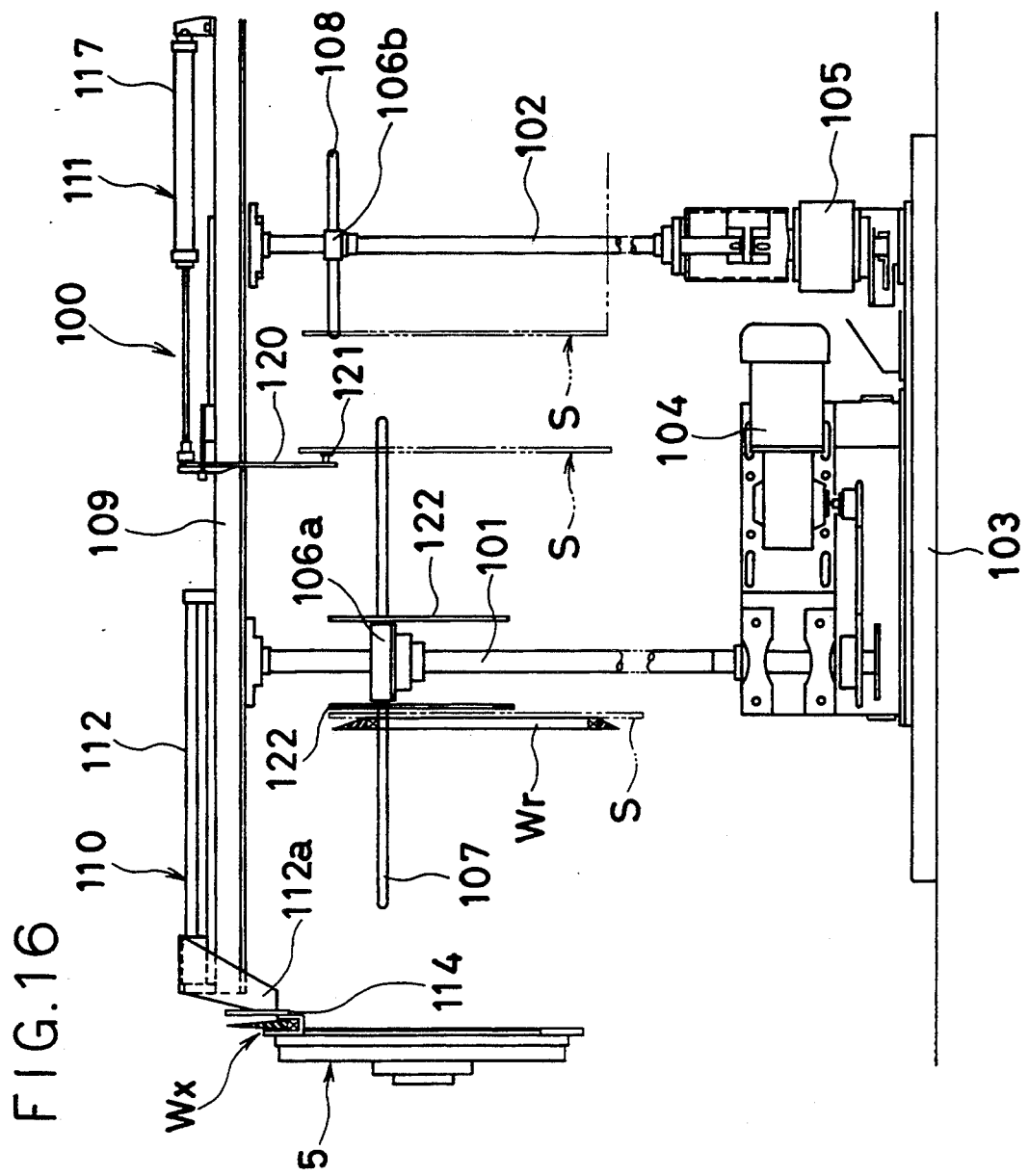
FIG. 16 is a front elevation of a recovery unit.
Figure 17:
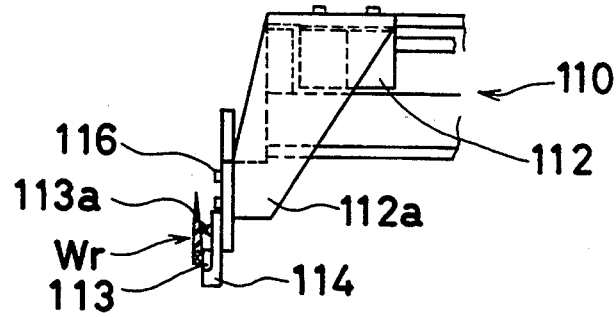
FIGS. 17 and 18 are a partial enlarged view in front elevation and an enlarged side elevation of a bead assembly attracting and retaining means.
Figure 18:
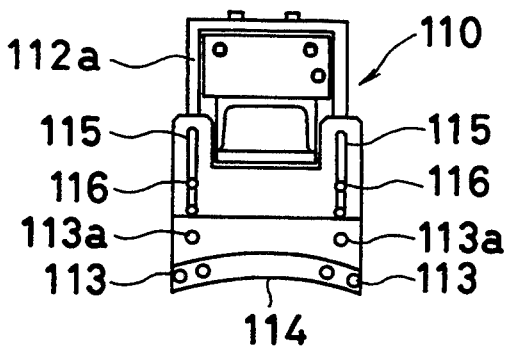
Figure 19:
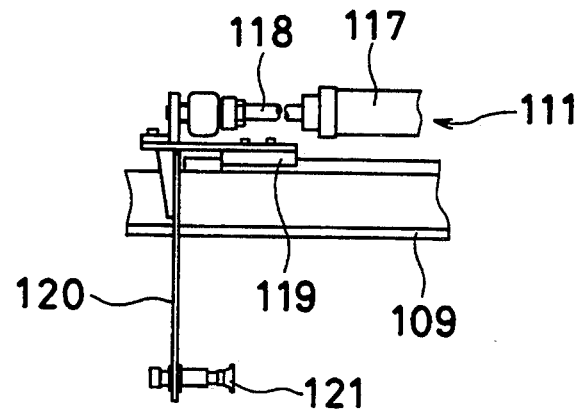
FIGS. 19 and 20 are a partial enlarged view in front elevation and an enlarged side elevation of a separator attracting and retaining means in the recovery unit.
Figure 20:
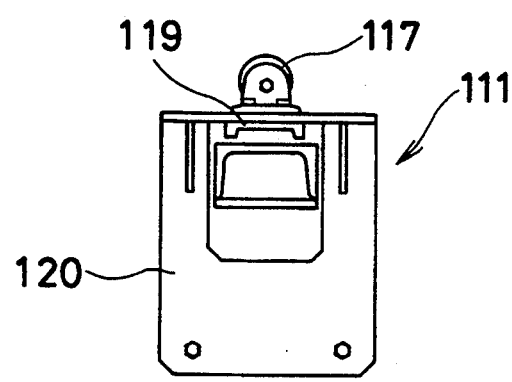
Figure 21:
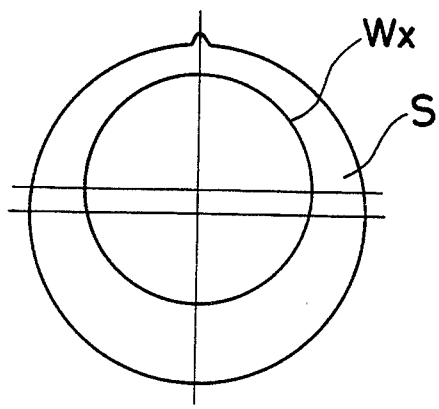
FIG. 21 illustrates the relation between a bead assembly and a separator in the recovery unit.
Figure 22:
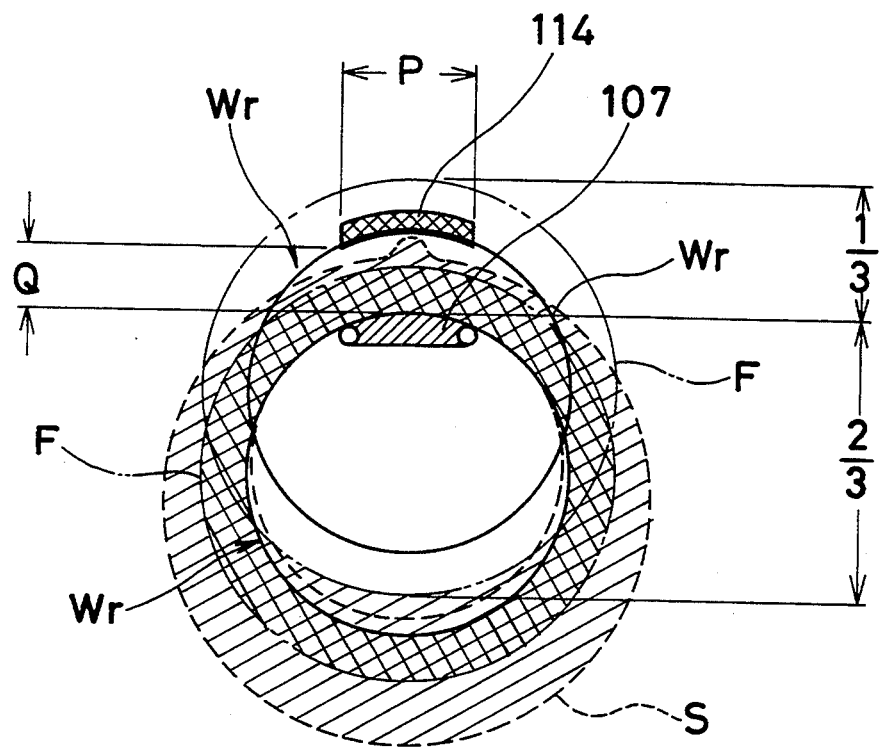
FIG. 22 illustrates the condition of a bead assembly and a separator which are being transferred in the recovery unit.

As shown in FIGS. 16-18, the completed product attracting means 110 has a rodless cylinder 112, to the front end of which a product attracting hand 112a is attached. The product attracting hand 112a is provided on its front surface with a crescent attraction plate 114 on which a plurality of magnets 113 and retainer needles 113a are arranged at predetermined intervals. The vertical position of the attraction plate 114 can be regulated via slits 115 and pins 116 along the product attracting hand 112a. The separator suction means 111 has a cylinder 117 provided horizontally on the support frame 109 as shown in FIGS. 16, 19 and 20. A suction support plate 120 adapted to be moved slidingly along the slide surface of a rail 119 is suspended vertically from the front end portion of a rod 118 of this cylinder 117, and a suction pad 121 for sucking a separator is fixed to the lower end portion of this suction support plate 120. Therefore, a separator S (FIGS. 16 and 21) hung on the separator storage arm 108 can be sucked by the separator suction means 111 and transferred onto the completed product storage arm 107. The storage arm 107 is then turned 180° to move a bead assembly Wr to the position D in which a final building step is to be carried out, and the bead assembly Wr is attracted to and held on the complete product attracting means 110 and transferred to the rearmost position on the complete product storage arm 107 so that the bead assembly Wr engages a stopper 122 or a separator S, the bead assembly Wr being then dropped. If the operations mentioned above are repeated, the separators S and completed bead assemblies Wr can be stored alternately in a regular order on both portions of the completed product storage arm 107 so that the bead assemblies Wr do not contact one another, until the storage arm 107 has been fully loaded with the separators S and complete bead assemblies Wr. As shown in FIG. 22, the bead assembly Wr attracted to the side surface of the crescent attraction plate 114 of a width P is transferred as the attraction plate 114 is kept spaced from the storage arm 107 by a distance corresponding to the height Q. A substantially ⅔ portion of a bead assembly Wr impinges upon a separator S transferred onto the arm 107 and falls from the crescent attraction plate 114. Accordingly, separators S and bead assemblies Wr are hung alternately always starting at the rearmost empty portion on the completed product storage arm 107 and stored thereon in a regularly arranged manner.

Each of the steps of feeding bead cores W, building bead fillers F, building flippers Fr, and recovering completed bead assemblies and storing the same in a regularly arranged manner will now be described with reference to FIGS. 23-33. The bead filler F used in this embodiment is formed by unitarily combining a filler body having a tapering surface on the bottom portion thereof with a projecting member having a tapering surface on the upper side thereof so that these tapering surfaces extend in the shape of the letter "V", so as to enable the bead filler F to be applied to a bead core W easily.

Figure 23:
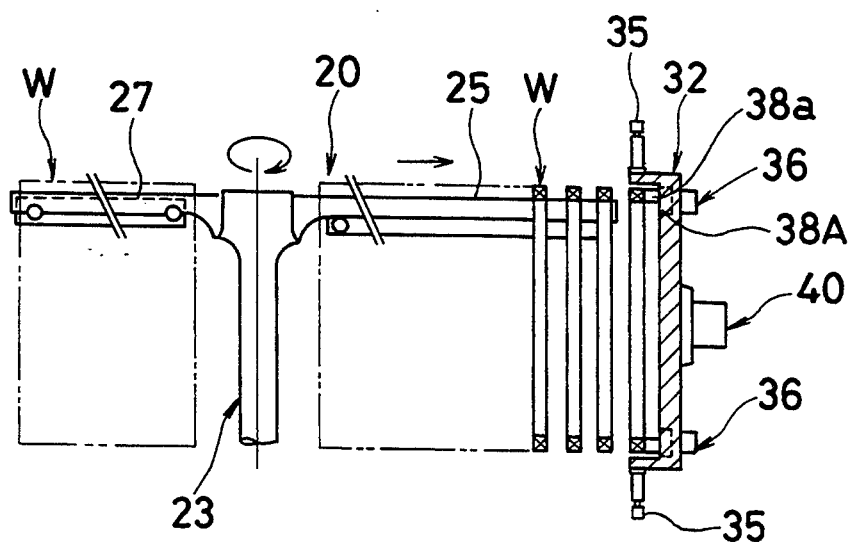
FIGS. 23–33 illustrate the manufacturing steps in the present invention.

First, bead cores W molded to a ring-like shape in some other step in advance are arranged on the fixed arms 25 in the feed unit 20 so that the bead cores W do not contact one another, and the fixed arms 25 are then turned to put them in the condition shown in FIG. 23. The moving arms 27 are turned vertically and longitudinally owing to the rotation of the driving motor 29 as they trace elliptic orbits, and the bead cores W hung on the fixed arms 25 are thus fed sequentially to the transfer position therefor.

Figure 24:
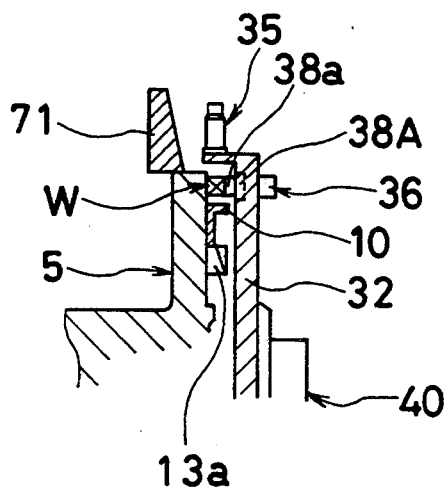

The frontmost bead core W out of the bead cores W thus sequentially sent out is then attracted to the magnets 38a on the bead core attract-releasing means 36 provided on the base plate body 32 in the loading unit 30 standing by in this transfer position, and this bead core W is held on the base plate body 32. The cylinders in the bead correcting means 35 provided on the circumferential edge portion of the base plate body 32 are then operated so as to correct the bead core W, which is attracted to and held on the base plate body 32, in such a manner that the bead core W becomes approximately circular. During this correction operation, the base plate body 32 is moved along the guide rails 31 to the bead core loading position of the bead locking drum 5 standing by in the first stopping position A. The base plate body 32 is then forced out toward the bead locking drum 5 by the push-in cylinder 43 in the push-in unit 40, and the bead core W is transferred onto the expansible ring 10 on the bead locking drum 5 as shown in FIG. 24.

Figure 25:
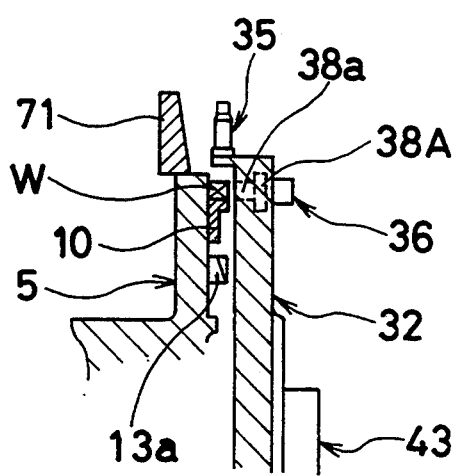

The fluid pressure cylinder 12f is then operated to move the shaft member 12a leftward in FIG. 4, expand the ring 10 and hold the bead core W on the bead locking drum 5. The cylinder 39 of the bead core attract-releasing means 36 is then operated to move back the magnet block 38A and disengage the magnets 38a from the bead core W. The operating air pressure in the push-in cylinder 43 is shifted to a high level to further extend the same cylinder 43 as shown in FIG. 25, whereby the base plate body 32 is brought into contact with the bead core W retained by the expansible ring 10, to smooth a bent portion of the bead core W by the side surface of the bead locking drum 5.

Figure 26:
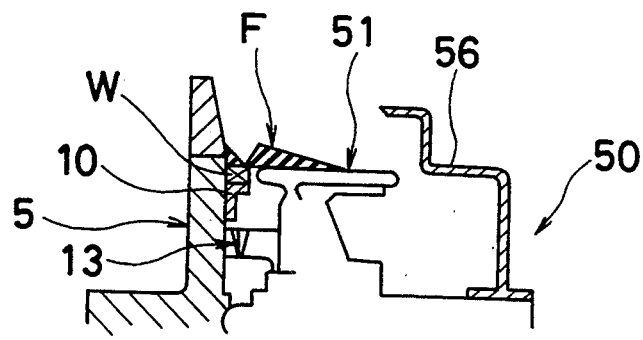
Figure 27:
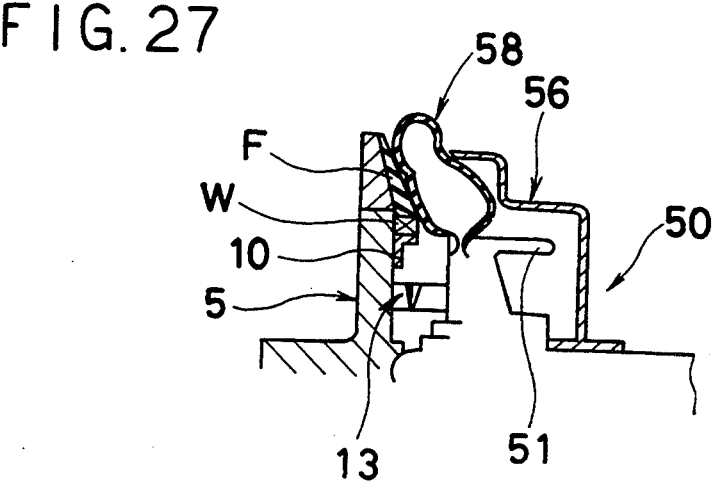
Figure 28:
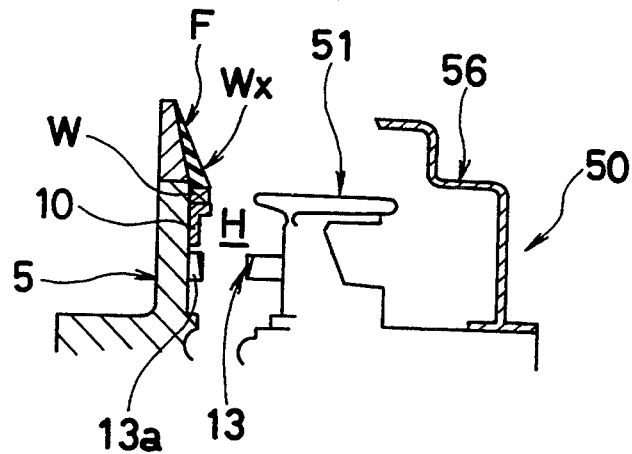

The rotary arm 4 is then turned 90° by the driving motor 7 in the rotary unit 1 to move the bead locking drum 5 on which the shape-corrected bead core W is held from the first stopping position A to the second stopping position B. In the second stopping position B, a bead filler F is wound cylindrically around the bead core W held on the bead locking drum 5, by the bead filler building unit 50 to form a filler-carrying bead assembly Wx. Namely, as shown in FIG. 26, the drum unit body 54 is moved to the head locking drum 5 along the slide rail 53 by an operation of the slide cylinder 62 in the bead filler building unit 50 to cause the bladder drum 51 to engage the load locking drum 5, and the clutch mechanism 13 to be coupled. A fin-carrying bead filler F cut according to the circumferential length of the bead core W in advance is then fed onto the bead core W by the attaching conveyor 68, and the front end portion of the bead filler F is attached on the bead core W. The driving shaft 52 is turned by an operation of the driving motor 61 to cause the bladder drum 51 and bead locking drum 5 to be turend together, whereby the bead filler F is attached cylindrically on the outer circumferential surface of the bead core W. After the bladder 58 has been inflated by supplying air thereto as shown in FIG. 27, the pusher cylinder 57 is operated to move the pusher ring 56 toward the bead locking drum 5. The fin-carrying bead filler F is raised until it has engaged the support wall 71 via the bladder 58, to form a bead assembly Wx in which the bead core W and bead filler F are unitarily combined. After the bead assembly Wx has been formed, the bladder drum 51 and pusher ring 56 are moved back as shown in FIG. 28. The backward movement of the bladder drum 51 is stopped with a clearance H, thorugh which the bead assembly Wx can be taken out, left between the same drum 51 and the bead locking drum 5.

Figure 29:
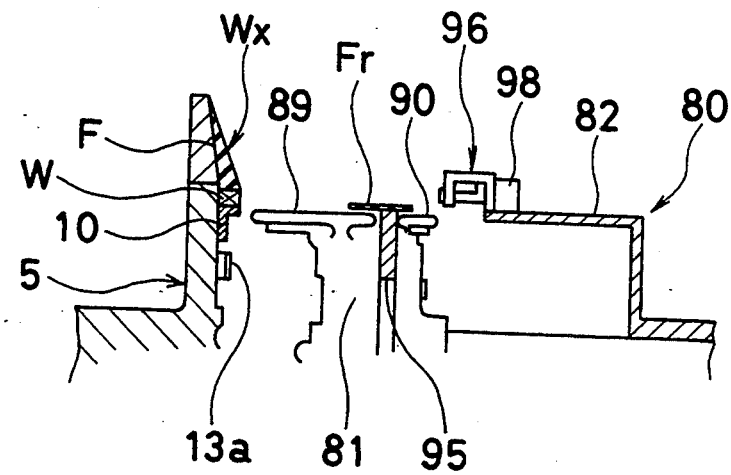
Figure 30:
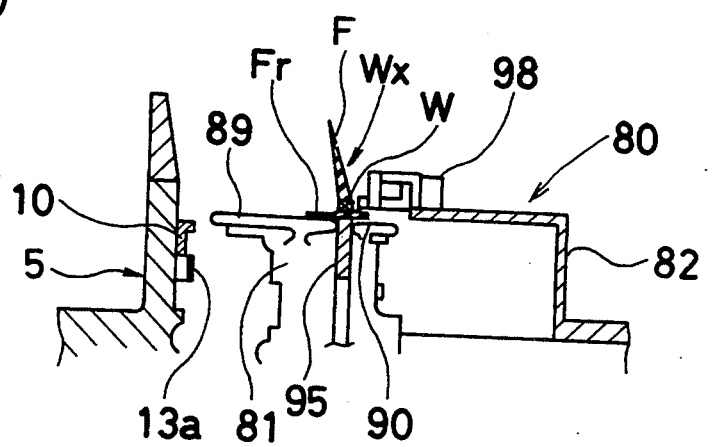
Figure 31:
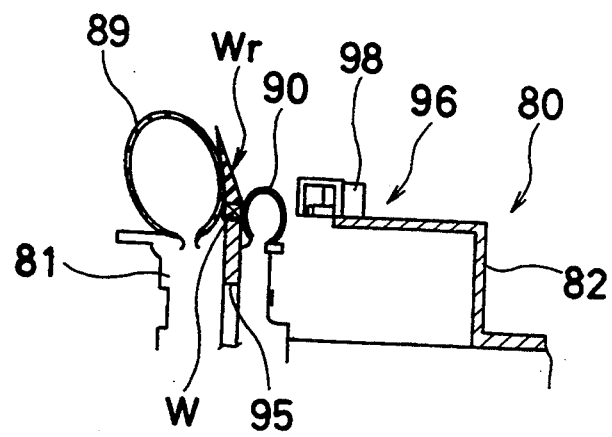

The rotary arm 4 of the rotary unit 1 is then turned 90° again, so that the bead locking drum 5 on which the bead assembly Wx is held is moved from the second stopping position B to the third stopping position C. In this third stopping position C, a flipper Fr is attached on the bead assembly Wx held on the bead locking drum 5, by the flipper building unit 80 to form a flipper-carrying bead assembly Wr. Namely, as shown in FIGS. 29-31, a flipper Fr cut in advance to a length in accordance with the circumferential length of the bead core W is supplied to the turnup drum 81, which is disposed in the vicinity of the bead locking drum 5, by the flipper attaching conveyor 79, and the front end portion of the flipper Fr is attached on the turnup drum 81. The driving shaft 83 is turned by an operation of the driving motor 93 to cause the turnup drum 81 to be turned, and the flipper Fr to be attached cylindrically on the outer circumferential surface of the turnup drum 81. The transfer ring 82 is then moved by the two-stage cylinder 87 with the turnup drum 81 left in the mentioned condition to the advancement position Ta in which the transfer ring 82 engages the bead locking drum 5. The rod of the transfer cylinder 98 in the flipper transfer unit 96 is then extended, and the bead assembly Wx held on the bead locking drum 5 is attracted to magnets 99a of the support ring 99.

Figure 32:
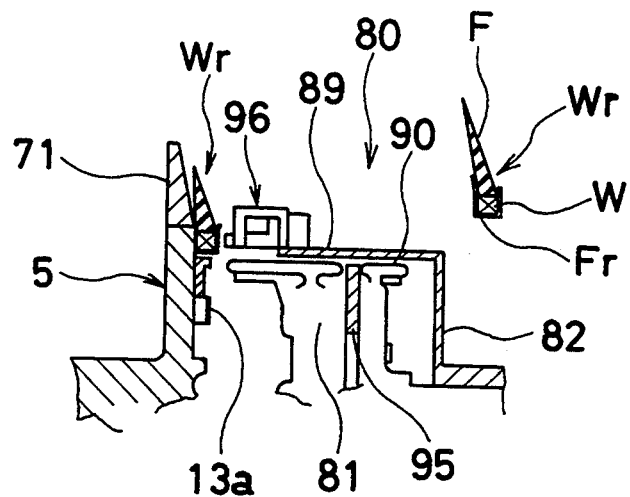
Figure 33:
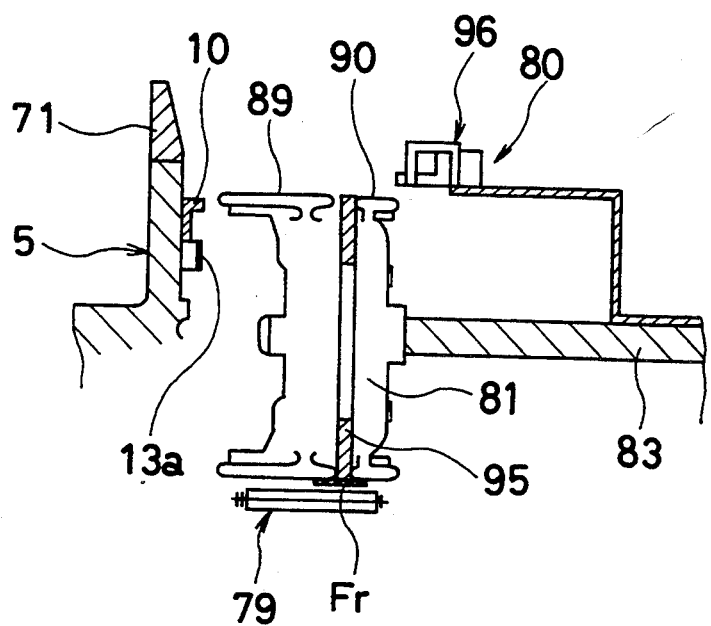
Figure 34:
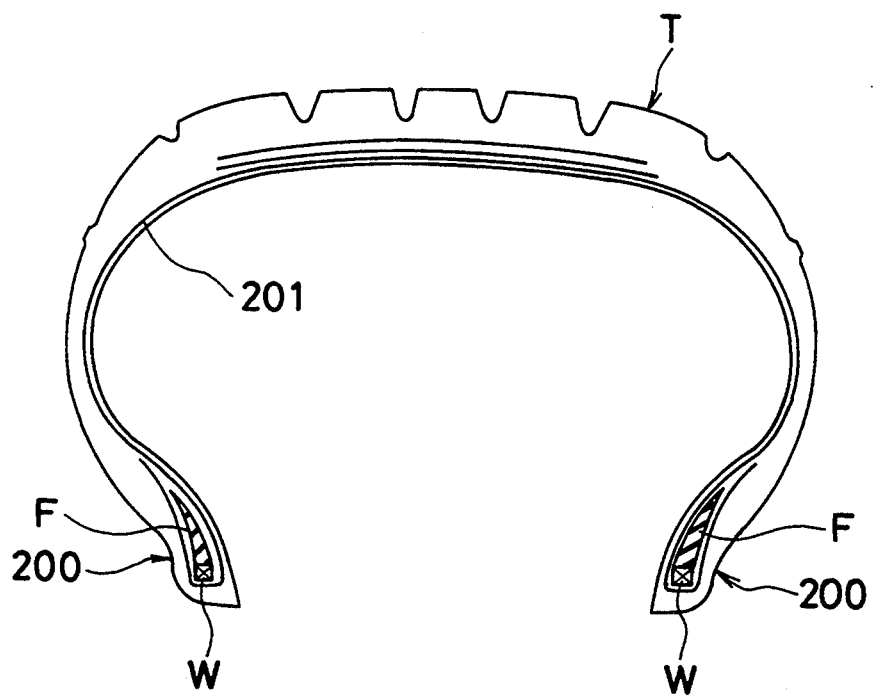
FIGS. 34 and 35(a–c) illustrate a bead assembly.

The fluid pressure cylinder 12f is then operated to move the shaft member 12a rightward in FIG. 4 and contact the expandable ring 10, and the transfer ring 82 is moved to the flipper building position Tb by the two-stage cylinder 87 to transfer the bead assembly Wx onto the flipper Fr placed on the bead locking ring 95. This bead locking ring 95 is then expanded to retain the bead assembly Wx thereon, and the transfer ring 82 is moved to the retirement position Tc by the two-stage cylinder 87. The air is supplied to the interior of the main and auxiliary bladders 89, 90 to inflate the same and paste the flipper Fr on the bead core assembly Wx so that the inner circumferential surface of the bead core W and both side surfaces of the bead filler F are covered therewith, whereby a flipper-carrying bead assembly Wr is formed. The transfer ring 82 is moved again to the flipper building position Tb by the two-stage cylinder 87, and the bead assembly Wr is attracted to the magnets 99a of the support ring 99, the bead locking ring 95 being thereafter contracted. As shown in FIG. 32, the transfer ring 82 is moved to the advancement position Ta, in which the transfer ring 82 engages the bead locking drum 5, by the two-stage cylinder 87, and the expansible ring 10 is expanded to hold the bead assembly Wr on the bead locking drum 5. The transfer ring 82 is moved to the original retirement position Tc as shown in FIG. 33.

The rotary arm 4 of the rotary unit 1 is then turned 90° again, so that the bead locking drum 5 holding the completed bead assembly Wr is moved from the third stopping position C to the final stopping position D. In the final stopping position D, a separator S hung on the separator storage arm 108 is sucked to the suction pad 121 by an operation of the cylinder 117 of the separator suction means 111 in the recovery unit 100, and transferred to the completed product storage arm 107 as shown in FIG. 16. The completed product storage arm 107 onto which the separator S has been transferred is then turned 180° by an operation of the index motor 104. The rodless cylinder 112 of the completed product attracting means 110 is then extended to magnetically fix the bead assembly Wr in the stopping position D to the magnet 113. After the expansible ring 10 on the bead locking drum 5 has been contracted, the rodless cylinder 112 is retracted to hang the bead assembly Wr on the completed product storage arm 107 so that the bead assembly Wr contacts the separator S as mentioned above. The bead cores W hand on the fixed arm 25 in the feed unit 20 are subjected to the above-mentioned steps sequentially, and separators S and completed bead assemblies Wr are alternately hung on the completed product storage arm 107 in the recovery unit 100, whereby the bead assemblies Wr are stored regularly in a non-mutually-contacting state.

In the above-described embodiment, flipper-carrying bead assemblies Wr are manufactured and stored in the recovery unit 100. Filler-carrying bead assemblies Wx not requiring flippers as reinforcing members may also be manufactured and stored in the recovery unit 100. In this case, three rotary arms 4 are arranged at 120° intervals on the rotary unit 1. The three bead locking drums provided on the free end portions of these rotary arms 4 are stopped in order in the first stopping position A, second stopping position B and final stopping position to carry out the respective steps.

As described above, the method of and apparatus for manufacturing bead assemblies are capable of manufacturing bead assemblies each of which consists of a ring-shaped bead core, a bead filler and a flipper by continuous automated steps, and thereby improving the productivity to a great extent. The apparatus according to the present invention enables the bead assembly-forming steps to be carried out without requiring a large space, and high-precision bead assemblies having a high and uniform quality to be manufactured.

What is claimed is:

1. An apparatus for manufacturing bead assemblies, comprising:

a rotary unit having a plurality of rotary arms arranged radially on the circumferential surface of a rotary shaft with each rotary arm having a bead locking drum on a free end portion thereof, each of said plurality of rotary arms being arranged 90° apart from each other, said bead locking drum of each of said plurality of rotary arms including an expansible ring that expands and contracts to lockingly hold a bead core on the bead locking drum;

a loading station having loading means for transferring a bead core to the bead locking drum of a corresponding rotary arm, said loading means including a base plate body slidingly movable along guide rails, said base plate body being provided on its side surface with a plurality of bead core attract-releasing means spaced at predetermined intervals in the circumferential direction thereof, for at least one of attracting and releasing the side surface of a bead core, and push-out means, for pushing out an attracted bead core onto a bead locking drum, each of said bead core attract-releasing means including a magnet for magnetically attracting and releasing the side surface of a bead core;

a building station having a bead filler building means for winding a bead filler around a bead core set on the bead locking drum of a second rotary arm, said bead filler building means being operatively formed so as to engage and disengage with a corresponding bead locking drum having a bead core held thereon, said bead filler building means engaging the corresponding bead locking drum when winding a bead filler around the bead core held on the bead locking drum, said bead filler building means including a bladder drum having a bladder at the outer circumferential portion thereof and a rotary driving shaft engageable with and disengageable from a rotary shaft of said bead locking drum via a clutch mechanism, said bladder drum being provided on an outer circumferential surface thereof with pusher means for moving said bladder towards said locking drum in the direction of said rotary driving shaft so as to push a bead filler into position with a bead core thereby forming a bead core assembly;

a flipper attaching station having a bead core assembly transfer means for transferring a bead core assembly to and from a corresponding bead locking drum, and a flipper building means for attaching a flipper onto a bead core assembly on the bead locking drum of a third rotary arm stopped at the flipper attaching station, said flipper building means including a dual bladder turnup drum, said bead core assembly transfer means having magnet means positioned for attracting and holding a side surface of the bead core assembly thereon to attach a flipper to thereby form a completed bead assembly; and a recovery station having a recovery means for taking out a completed bead assembly formed on the bead locking drum of a last rotary arm, said recovery means having a vertically disposed rotary shaft for completed products and a vertically disposed rotary shaft for separators, the rotary shafts being spaced by a predetermined distance, said rotary shaft for completed products being provided with a horizontally extending completed product storage arm, said rotary shaft for separators being provided with a horizontally extending separator storage arm, both of the vertically disposed rotary shafts being provided thereabove with a completed bead transfer means for transferring a completed bead assembly from said bead locking drum onto said completed product storage arm, and a separator transfer means for transferring a separator hung on said separator storage arm onto said completed product storage arm, said completed bead assembly transfer means including an attracting unit for attracting a completed bead assembly from a corresponding bead locking drum said attracting unit having magnet means positioned for magnetically attracting a side surface of the bead assembly thereon to take out the completed bead assembly; said rotary arm unit being formed such that one of the plurality of rotary arms is alignably positioned with at least the loading, building, attaching and recovery stations and in operation each of the rotary arms rotates into position with each of the loading, building, attaching and recovery stations.

2. An apparatus for manufacturing bead assemblies according to claim 1, wherein the loading means is provided on a circumferential edge portion of said base plate body with a plurality of bead correcting means spaced at predetermined intervals, for extending toward and retracting from a center of said base plate body.

3. An apparatus for manufacturing bead assemblies according to claim 1, wherein said bead locking drum is provided with a support wall capable of being moved forward and backward and interchangeable with another in accordance with the shape and attitude of said bead filler.

* * * * *